(12) United States Patent
Chisaka

(10) Patent No.: US 8,958,844 B2
(45) Date of Patent: Feb. 17, 2015

(54) COMMUNICATION METHOD AND BASE STATION APPARATUS

(75) Inventor: Takumi Chisaka, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 531 days.

(21) Appl. No.: 13/321,657

(22) PCT Filed: May 26, 2010

(86) PCT No.: PCT/JP2010/003534
§ 371 (c)(1),
(2), (4) Date: Nov. 21, 2011

(87) PCT Pub. No.: WO2010/137314
PCT Pub. Date: Dec. 2, 2010

(65) Prior Publication Data
US 2012/0071201 A1  Mar. 22, 2012

(30) Foreign Application Priority Data

May 27, 2009  (JP) ................................. 2009-128244
Oct. 1, 2009  (JP) ................................. 2009-229931

(51) Int. Cl.
H04B 7/00 (2006.01)
H04W 36/00 (2009.01)
H04W 36/22 (2009.01)

(52) U.S. Cl.
CPC .......... H04W 36/0055 (2013.01); H04W 36/22 (2013.01)
USPC ......... 455/525; 455/67.11; 455/436; 370/331

(58) Field of Classification Search
CPC ..... H04W 48/20; H04W 16/24; H04W 36/18; H04W 24/08; H04W 36/0083; H04W 36/04; H04W 36/30; H04W 36/0061; H04W 64/00; H04W 40/24; H04W 28/08; H04W 36/0055; H04W 40/248; H04B 7/2675; H04L 47/283; H04L 7/08
USPC ........... 455/440, 442, 436–439, 435.3, 67.11, 455/525; 370/331–334, 320
See application file for complete search history.

(56) References Cited

U.S. PATENT DOCUMENTS 5,946,621 A * 8/1999 Chheda et al. ................. 455/440
6,101,175 A * 8/2000 Schorman et al. ............. 370/331

(Continued)

FOREIGN PATENT DOCUMENTS

JP 2006-352337 A 12/2006
JP 2008-187688 A 8/2008

(Continued)

OTHER PUBLICATIONS

Japanese Office Action "Notification of Reasons for Refusal" dated May 14, 2013, which corresponds to Japanese Patent Application No. 2009-229931 and is related to U.S. Appl. No. 13/321,657 with translation.

(Continued)

Primary Examiner — Sujatha Sharma
(74) Attorney, Agent, or Firm — Studebaker & Brackett PC

(57) ABSTRACT

A terminal 204 requests handover to a base station 201 if the terminal detects deterioration in a communication state during communication with the base station 201. Upon reception of the handover request, the base station 201 obtains information (available base station list) on a plurality of base stations capable of communicating with the terminal 204 from the terminal 204, and based on the information obtained and a value (RTT) indicative of a communication processing time between the base stations, decides a handover destination base station to connect to the terminal 204 for communication.

11 Claims, 12 Drawing Sheets

(56) References Cited

U.S. PATENT DOCUMENTS

| | | | |
|---|---|---|---|
| 6,532,274 B1 * | 3/2003 | Ruffini | 375/356 |
| 7,126,966 B2 * | 10/2006 | Jokinen et al. | 370/509 |
| 7,139,575 B1 * | 11/2006 | Chen et al. | 455/437 |
| 7,251,267 B2 * | 7/2007 | Panchal et al. | 375/148 |
| 2010/0034170 A1 | 2/2010 | Hirano et al. | |
| 2010/0118731 A1 | 5/2010 | Koyanagi | |
| 2011/0299502 A1 * | 12/2011 | Jung et al. | 370/331 |

FOREIGN PATENT DOCUMENTS

| | | |
|---|---|---|
| JP | 2008-219656 A | 9/2008 |
| WO | 2008/102564 A1 | 8/2008 |
| WO | 2009/016749 A1 | 2/2009 |

OTHER PUBLICATIONS

International Search Report; PCT/JP2010/003534; Aug. 24, 2010.

* cited by examiner

COMMUNICATION METHOD AND BASE STATION APPARATUS

CROSS REFERENCE TO RELATED APPLICATIONS

This application claims priority to and the benefit of Japanese Patent Application No. 2009-128244 (filed on May 27, 2009) and Japanese Patent Application No. 2009-229931 (filed on Oct. 1, 2009), the entire contents of which are incorporated herein by reference.

TECHNICAL FIELD

The present invention relates to communication methods and base station apparatuses for achieving prompt handover in a radio communication system including a plurality of base station apparatuses.

BACKGROUND ART

Conventionally, a radio communication system, to which mobile phone terminals are wirelessly connected, is configured to allow the mobile phone terminals to perform voice call or the like by radio communications with a base station. FIG. 12 is a diagram illustrating a relation between the base station and the mobile phone terminal. As shown in FIG. 12, if a communication environment is deteriorated during communication between a terminal 104 and a base station 101 due to deterioration in radio intensity or the like, the terminal 104 can no longer continue the communication. Upon detection of deterioration in an environment of the communication with the base station 101 in communication, the terminal 104 executes, in order to continue the communication, processing of handover (H/O) to change an access point from the base station 101 currently connected to one of available base stations $102_1$-$102_N$ with a better communication environment. Here, the selection of a handover destination base station is made based on a communication states so that a base station with a better communication state for the terminal, such as a base station with high radio intensity (downlink radio intensity) detected by the terminal 104 which requests handover, is selected.

PRIOR ART DOCUMENT

Patent Document

Patent Document 1: JP 2006-352337 A

SUMMARY OF INVENTION

Technical Problem

However, if a plurality of terminals intensively selects one base station as a candidate of handover destination with a better communication state for the terminals, the base station selected is overloaded, possibly resulting in a congestion state.

To solve such a problem, it may be considered to configure the base stations to share load information of each other and disperse the load to each other based on the load information. In order to share the load information of base stations, however, one base station must transmit its load information to all of other base stations, which increases packet transmission and thus weighs on link resources.

In addition, if the handover destination base station selected is in the congestion state, it causes deterioration in a communication quality such as disconnection of the communication as it takes time for the terminal to execute handover.

In consideration of such problems, an object of the present invention is to provide a communication method and a base station apparatus capable of avoiding intensive selection of a base station as a handover destination and capable of effective utilization of the link resources and prompt completion of handover of the terminal.

Solution to Problem

In order to achieve the above object, according to the present invention, a communication method of a radio communication system including a radio terminal apparatus and a base station apparatus which performs radio communication with the radio terminal apparatus and allowing for communication between a plurality of base station apparatuses, includes the steps of: obtaining, by the base station apparatus being connected to the radio terminal apparatus, information on a plurality of base station apparatuses capable of communicating with the radio terminal apparatus, from the radio terminal apparatus; and determining, by the base station apparatus being connected to the radio terminal apparatus, an access point base station apparatus to connect to the radio terminal apparatus for communication based on the information on the plurality of base station apparatuses obtained at the step of obtaining and a value indicative of a communication processing time between the base station apparatuses.

It is preferred that the step of determining includes estimating a load condition of each of the base station apparatuses in the information on the plurality of base station apparatuses obtained at the step obtaining based on the value indicative of the communication processing time between the base station apparatuses and determining the access point base station apparatus to connect to the radio terminal apparatus for communication based on the load condition of each of the base station apparatuses estimated, wherein the radio terminal apparatus is within a coverage area of the access point base station apparatus.

Preferably, the value indicative of the communication processing time between the base station apparatuses is a round trip time between the base station apparatuses or a value based on Network Time Protocol (NTP) communication of the base station apparatuses.

Moreover, according to the present invention, a communication method of a radio communication system including a radio terminal apparatus and a base station apparatus which performs radio communication with the radio terminal apparatus and allowing for communication between a plurality of base station apparatuses, including the steps of: obtaining, by the base station apparatus being connected to the radio terminal apparatus, information on a plurality of base station apparatuses capable of communicating with the radio terminal apparatus including evaluation values indicative of communication states between the radio terminal apparatus and the plurality of base station apparatuses capable of communicating with the radio terminal apparatus, from the radio terminal apparatus; and determining, by the base station apparatus being connected to the radio terminal apparatus, an access point base station apparatus to connect to the radio terminal apparatus for communication based on the information on the plurality of base station apparatuses including the evaluation values obtained at the step of obtaining and a value indicative of a communication processing time between the base station apparatuses.

It is preferred, at the step of determining, to determine a base station apparatus having a highest evaluation value among base station apparatuses having the values indicative of the communication processing time between the base station apparatuses less than a threshold, as the access point base station apparatus to connect to the radio terminal apparatus for communication.

It is preferred, at the step of determining, to exclude at least a base station apparatus with a lowest evaluation value among base station apparatuses having the values indicative of the communication processing time between the base station apparatuses less than a threshold from the access point base station apparatus to connect to the radio terminal apparatus for communication.

Preferably, the value indicative of the communication processing time between the base station apparatuses is a round trip time between the base station apparatuses or a value based on Network Time Protocol (NTP) communication of the base station apparatuses.

A base station apparatus according to the present invention includes: a communication processing time obtaining unit configured to obtain a value indicative of a communication processing time between base station apparatuses; a base station information obtaining unit configured to obtain, from a radio terminal apparatus being connected, information on a plurality of base station apparatuses capable of communicating with the radio terminal apparatus; and a determination unit configured to determine an access point base station apparatus to connect to the radio terminal apparatus for communication based on the information on the plurality of base station apparatuses obtained by the base station information obtaining unit and the value indicative of the communication processing time between the base station apparatuses obtained by the communication processing time obtaining unit.

Moreover, a base station apparatus according to the present invention includes: a communication processing time obtaining unit configured to obtain a value indicative of a communication processing time between base station apparatuses; a base station information obtaining unit configured to obtain, from a radio terminal being connected, information on a plurality of base station apparatuses capable of communicating with the radio terminal apparatus including evaluation values indicative of communication states between the radio terminal apparatus and the plurality of base station apparatuses capable of communicating with the radio terminal apparatus; and a determination unit configured to determine an access point base station apparatus to connect to the radio terminal apparatus for communication based on the information on the plurality of base station apparatuses including the evaluation values obtained by the base station information obtaining unit and the value indicative of the communication processing time between the base station apparatuses obtained by the communication processing time obtaining unit.

Effect of the Invention

According to the present invention, a handover destination base station is determined based on the communication processing time between base stations. That is, a terminal does not perform handover simply to a base station which appears to have a good communication state. Therefore, it can prevent a problem that the same base station is intensively selected by other terminals within a coverage area of the base station.

According to the present invention, moreover, there is no need for the base stations to share the load information of each other, which enables effective utilization of link resources for communications between base stations.

According to the present invention, furthermore, since a base station with, for example, a short communication processing time between base stations is determined as the handover destination base station, it is possible to execute data transfer rapidly between the base stations during handover, which enables quick completion of handover.

DESCRIPTION OF EMBODIMENTS

Figure 1:
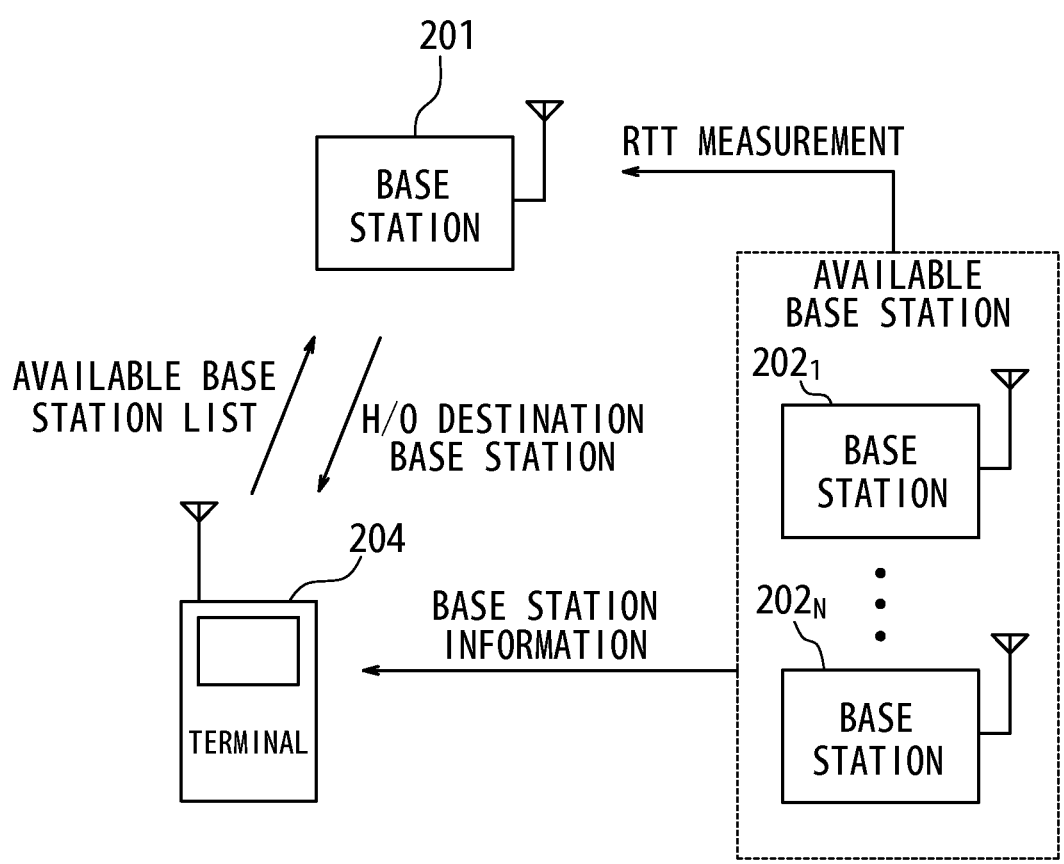
FIG. 1 is a diagram illustrating a relation between a base station and a terminal according to the present invention.

Embodiments of the present invention will be described with reference to the accompanying drawings. FIG. 1 is a diagram illustrating a relation between base stations and a terminal according to the present invention. A terminal 204 (radio terminal apparatus) may be, for example, a mobile phone terminal or a mobile information terminal with a communication function. When detecting deterioration in a communication state during communication with a base station 201 (base station apparatus), the terminal 204 sends a handover request to the base station 201. Upon reception of the handover request, the base station 201 obtains, from the terminal 204, information (an available base station list) on a plurality of base stations $202_1$-$202_N$ capable of communicating with the terminal 204, and based on the information obtained and a value indicative of a communication processing time between the base stations, determines a handover destination base station to connect to the terminal 204 for communication. The terminal 204 executes handover to the handover destination base station determined.

Here, the value indicative of the communication processing time between the base stations may be a Round Trip Time (RTT) between the base stations. The value indicative of the communication processing time between the base stations may be also a value based on NTP (Network Time Protocol) communication of the base station.

Figure 2:
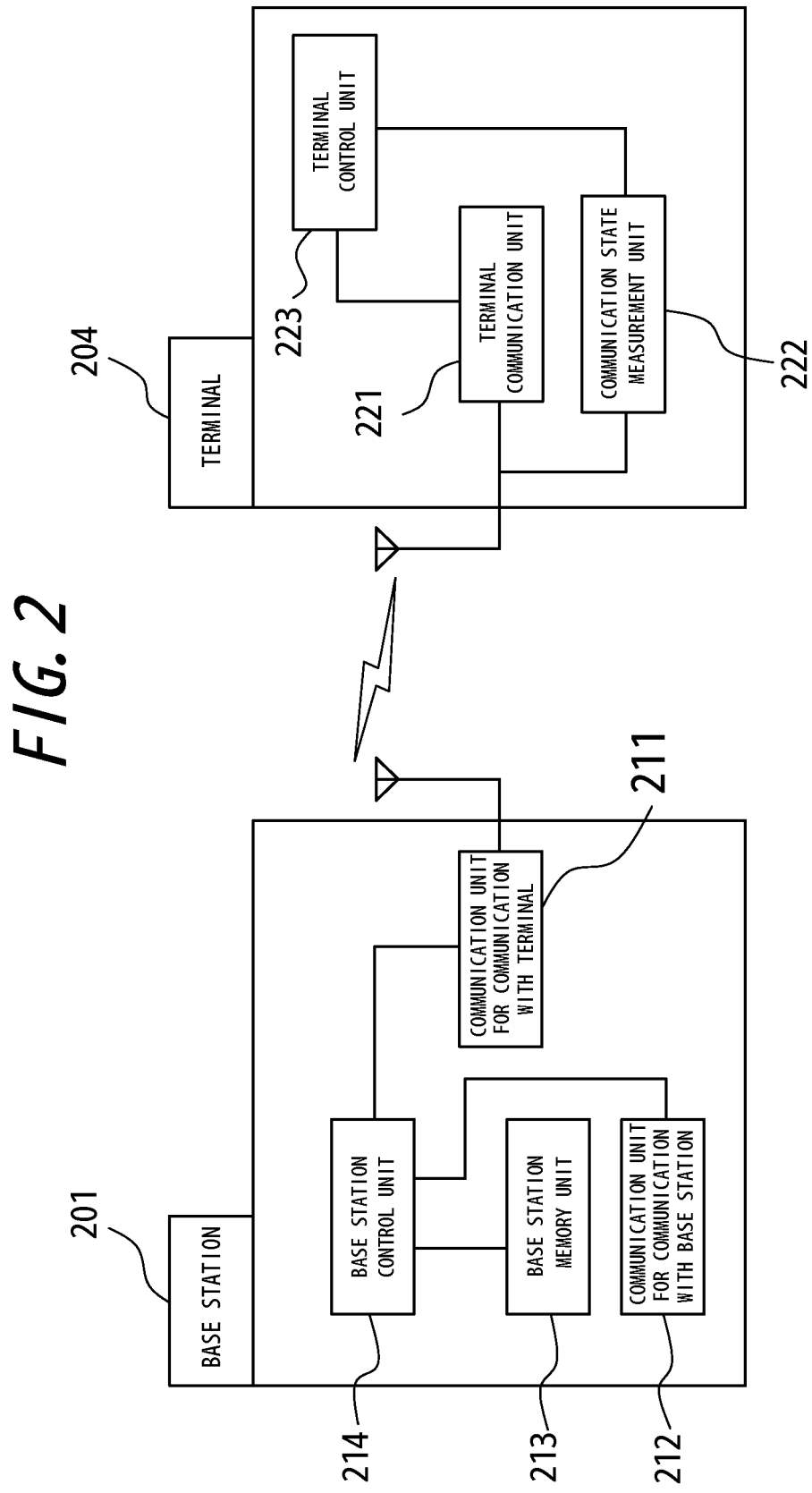
FIG. 2 is a diagram illustrating schematic configurations of a base station and a terminal according to a first embodiment of the present invention.

FIG. 2 is a diagram illustrating schematic configurations of a base station and a terminal according to a first embodiment of the present invention. The base station 201 shown in FIG. 2 has, at least, a communication unit 211 for communication with a terminal, a communication unit 212 for communication with a base station, a base station memory unit 213 (base station information obtaining unit) and a base station control unit 214.

The communication unit 211 for communication with a terminal communicates with the terminal 204. The communication unit 212 for communication with a base station communicates with base stations. However, if capable of distinguishing a communication partner between a base station and a terminal, the communication unit 211 for communication with a terminal and the communication unit 212 for communication with a base station can be configured as one communication unit. The base station memory unit 213 stores an available base station list, which is information on a plurality of base stations capable of communicating with the terminal 204, sent from the terminal 204. The available base station list is used for handover of the terminal 204.

Figure 3:
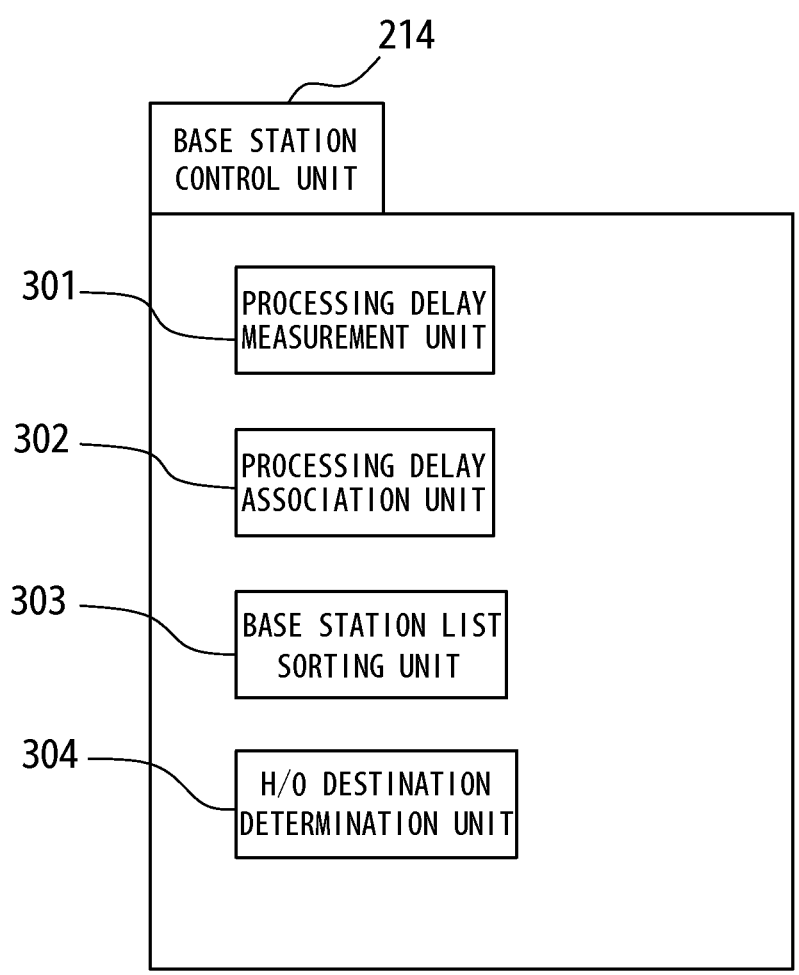
FIG. 3 is a diagram illustrating a schematic configuration of a base station control unit.

As shown in FIG. 3, the base station control unit 214 includes a processing delay measurement unit 301 (communication processing time obtaining unit), a processing delay association unit 302 (determination unit), a base station list sorting unit 303 (determination unit) and a handover (H/O) destination determination unit 304 (determination unit).

The processing delay measurement unit 301 uses the RTT, which is a value indicative of the communication processing time between the base stations, as a value for measuring a processing delay of a target base station in communication between the base stations. The processing delay measurement unit 301 may use the RTT of a protocol such as TCP (Transmission Control Protocol) or SCTP (Stream Control Transmission Protocol).

The processing delay association unit 302 associates each of the base stations in the available base station list sent from the terminal 204 with the RTT of each base station measured by the processing delay measurement unit 301. The base station list sorting unit 303 prioritizes base stations to be a handover destination defined in the available base station list based on the value indicative of the communication processing time between the base stations. The handover destination determination unit 304 determines a handover destination base station to present to the terminal 204 according to the priority determined.

That is, the base station list sorting unit 303 sorts the base stations in the available base station list associated with the RTTs by the processing delay association unit 302 in ascending order of the RTTs in comparison, and the handover destination determination unit 304 selects the handover destination base station to present to the terminal 204 among the base stations sorted in ascending order.

The terminal 204 shown in FIG. 2 has, at least, a terminal communication unit 221, a communication state measurement unit 222 and a terminal control unit 223.

The terminal communication unit 221 communicates with the base station 201. The communication state measurement unit 222 monitors communication states of the base station 201 and other base stations capable of communicating with the terminal 204. Values indicative of the communication state may be radio intensity, SNR (Signal to Noise Ratio) and the like. The communication state measurement unit 222 measures those values.

Figure 4:
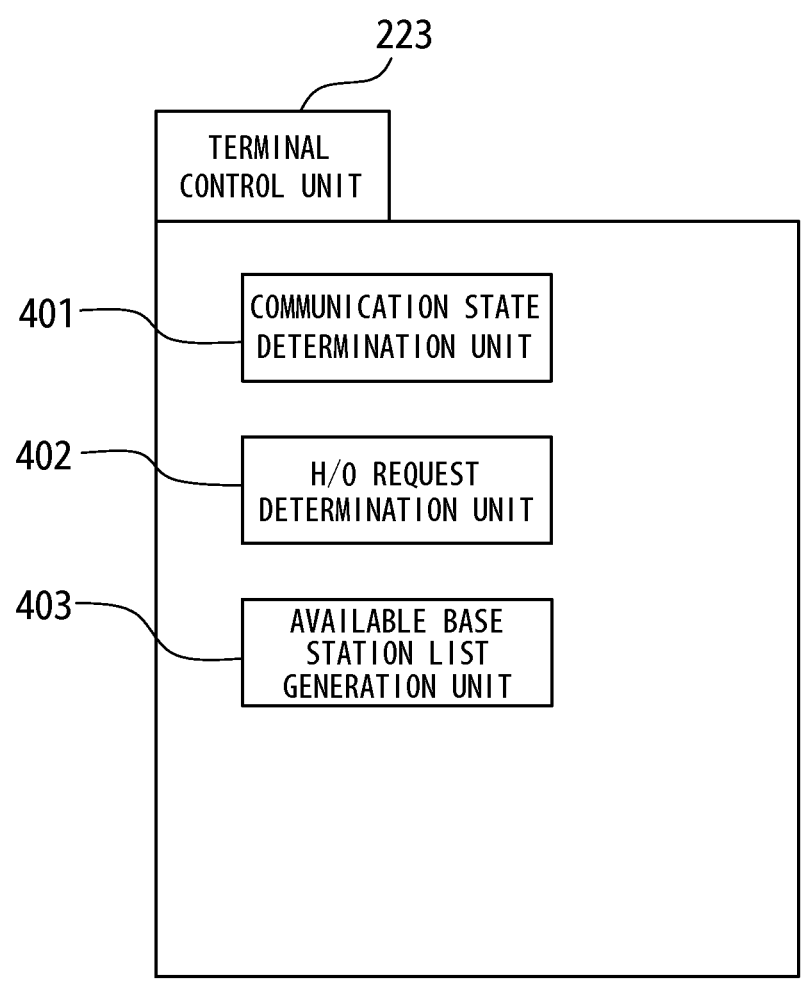
FIG. 4 is a diagram illustrating a schematic configuration of a terminal control unit.

As shown in FIG. 4, the terminal control unit 223 has, at least, a communication state determination unit 401, a handover (H/O) request determination unit 402 and an available base station list generation unit 403.

The communication state determination unit 401 determines that the communication state is deteriorated if the value indicative of the communication state of the base station 201 measured by the communication state measurement unit 222 has reached a certain threshold. Deterioration in the communication state may be ascribed to, for example, increase in communication delay between the terminal 204 and the base station 201, reduction in the radio intensity of received signals and increase in noise in the received signals.

When the communication state determination unit 401 determines that the communication state is deteriorated, the handover request determination unit 402 determines whether to request handover. At this time, the handover request determination unit 402 may determine to refrain from handover during an emergency call (call to the police or the fire department) or handover within the same base station.

When the handover request determination unit 402 determines to request handover to the base station 201 to which the terminal 204 is connected, the available base station list generation unit 403 searches nearby base stations capable of communicating with the terminal 204 and executes processing to generate a table of the available base station list.

Figure 5:
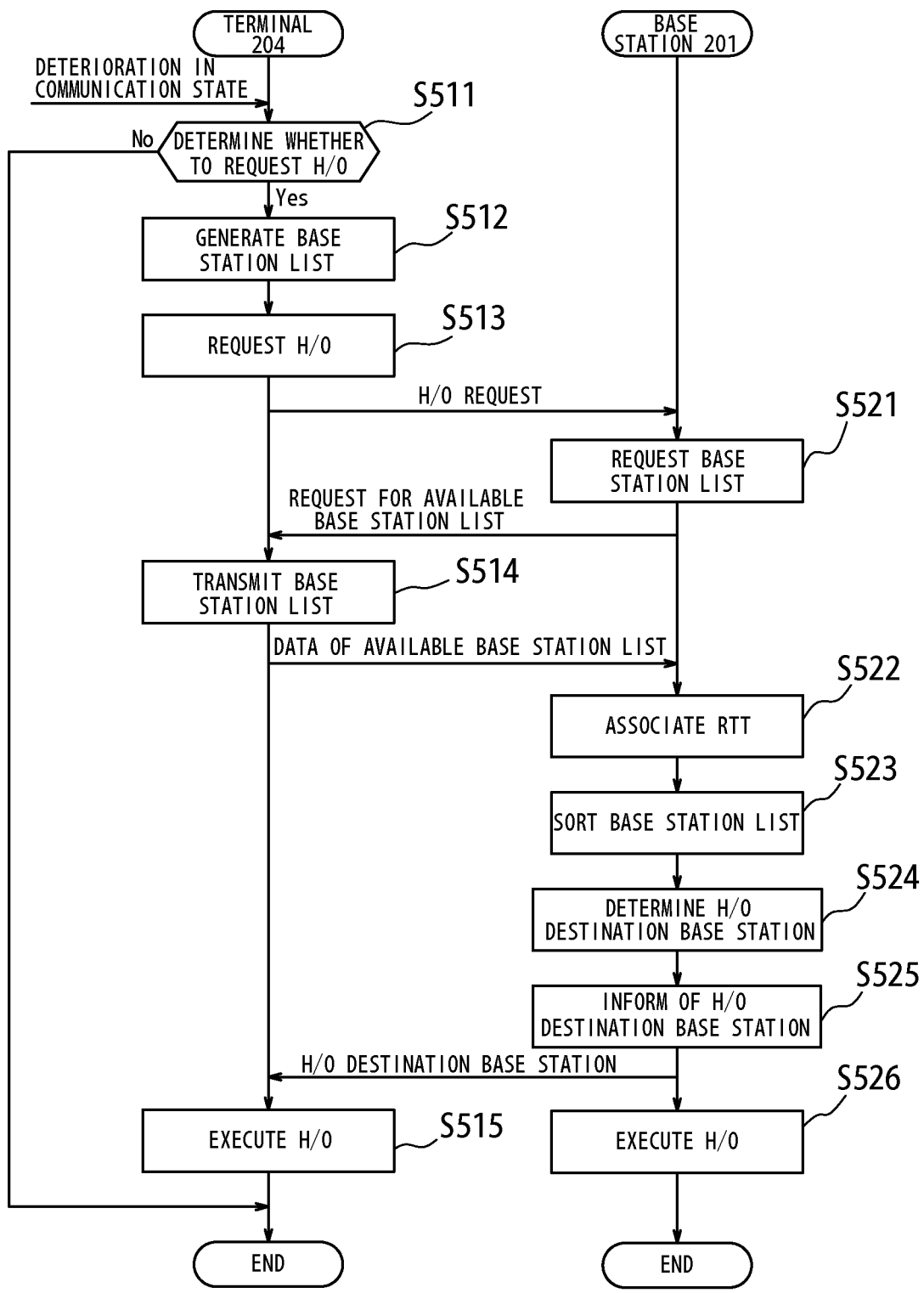
FIG. 5 is a sequence diagram illustrating execution of handover based on a handover request from the terminal.

Next, operations of the base station and the terminal according to the first embodiment of the present invention will be described with reference to a sequence diagram shown in FIG. 5. FIG. 5 is a sequence diagram illustrating execution of handover based on the handover request from the terminal.

If the communication state measurement unit 222 of the terminal 204 detects deterioration in the communication state during communication between the terminal 204 and the base station 201, the handover request determination unit 402 of the terminal control unit 223 shown in FIG. 4 determines whether to execute the handover (H/O) request (S511). If the handover request determination unit 402 determines not to execute the handover request (No), the terminal control unit 223 ends the processing. If the handover request determination unit 402 determines to execute the handover request (Yes), the available base station list generation unit 403 searches nearby other base stations capable of communicating with the terminal 204 and generates the available base station list (S512). At this time, in order to search the base stations, the terminal communication unit 221 may be configured to receive signals of broadcast control channels for search for the base stations, broadcasted by the base stations.

Next, the terminal 204 executes the handover request to the base station 201 (step S513). Upon reception of the handover request, the base station control unit 214 of the base station 201 requests the available base station list to the terminal 204 (S521). In response, the terminal 204 transmits the available base station list to the base station 201 (S514). The available base station list is transmitted from the terminal communication unit 221 to the base station 201 in communication.

The base station control unit 214 of the base station 201 extracts base stations which correspond to base stations stored in a list of connected base stations, stored in the base station 201, from the available base station list transmitted from the terminal 204. The processing delay association unit 302 of the base station control unit 214 estimates a load condition of each of the base stations extracted from the available base station list based on the value indicative of the communication processing time between the base stations, and associates the estimated load condition of the base stations with the base stations in the available base station list. In practice, the processing delay association unit 302 associates the RTTs in SCTP information stored in the base station 201 with the base stations in the available base station list (S522).

Such association is processing to associate an identifier of a base station with one RTT of SCTP communication between the base station and the base station 201. The identifier of the base station is a number or a character string unique to the base station and may be, for example, a base station ID, an IP address, a MAC address or a host name.

The base station control unit 214 determines the handover destination base station based on the load condition estimated. Specifically, the base station control unit 214 sets a list of base stations associated with the RTTs as a list of handover candidate base stations, and selects the handover destination base station from the list of base stations. At this time, it can be considered that a base station with a small RTT has a light load, whereas a base station with a large RTT has a heavy load and close to a congestion state. The base station list sorting unit 303 of the base station control unit 214 sorts the base stations in the list of handover candidate base stations based on such a standard described above (S523). The handover destination determination unit 304 of the base station control unit 214 determines a base station with a smallest RTT in comparison in the list of handover candidate base stations as the handover destination base station (S524).

As a method to determine the base station with the smallest RTT in comparison as the handover destination base station, there are, for example, a method to determine the base station with the smallest RTT as the handover destination base station by sorting the base stations in simple ascending order of the RTTs and a method to determine a base station with a largest range of reduction in the RTT as the handover destination base station by sorting the base stations in descending order of the ranges of reduction in the RTT based on the RTT before a unit time.

The base station 201 informs the terminal 204 of the handover destination base station determined (S525). The base station 201 and the terminal 204 informed of the handover destination base station by the base station 201 execute handover (S515, S526).

Figure 6:
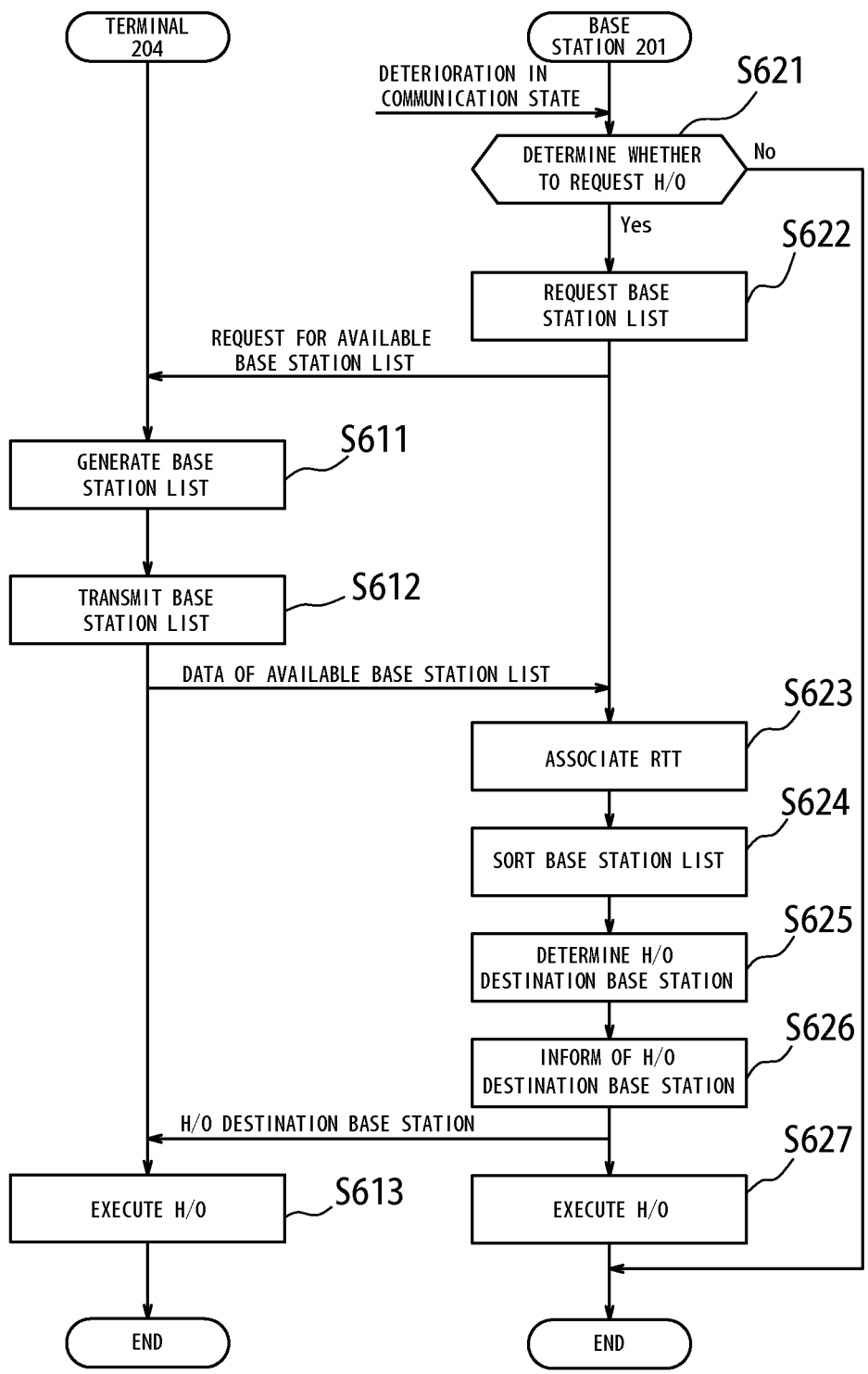
FIG. 6 is a sequence diagram illustrating execution of handover based on determination by the base station.

FIG. 6 is a sequence diagram illustrating operations of the base station and the terminal to execute handover based on determination by the base station. Upon detection of deterioration in the communication state during communication with the terminal 204, the base station control unit 214 of the base station 201 determines whether to execute handover to change an access point of the terminal 204. In addition, if the base station is put into the congestion state, the base station control unit 214, in order to reduce the load, determines whether to execute handover to change the access point of the terminal 204 (S621). If determining not to execute handover (No), the base station control unit 214 ends the processing. If determining to execute handover (Yes), the base station control unit 214 commands the terminal 204 in communication to execute handover and requests the available base station list (S622).

In response, the available base station list generation unit 403 of the terminal 204 searches nearby other base stations capable of communicating with the terminal 204 and generates the available base station list (S611). At this time, in order to search base stations, the terminal communication unit 221 is configured to receive signals of the broadcast control channels for search for the base stations, broadcasted by the base stations. Next, the terminal 204 transmits the available base station list to the base station 201 (S612). The available base station list generated by the available base station list generation unit 403 is transmitted from the terminal communication unit 221 to the base station 201 in communication.

The base station control unit 214 extracts base stations which correspond to the base stations in the list of connected base stations stored in the base station 201 from the available base station list received from the terminal 204. The processing delay association unit 302 of the base station control unit 214 estimates the load condition of each of the base stations extracted from the available base station list based on the value indicative of the communication processing time between the base stations and associates the estimated load conditions of the base stations with the base stations in the available base station list. In practice, the processing delay association unit 302 associates the RTTs in the SCTP information stored in the base station 201 with the base stations in the available base station list (S623).

The base station control unit 214 determines the handover destination base station based on the load condition estimated. That is, the base station control unit 214 sets the list of base stations associated with the RTTs as a list of handover candidate base stations, and selects the handover destination base station from the list of base stations. At this time, it may be considered that the base station with a small RTT has a light load, whereas the base station with a large RTT has a heavy load and close to the congestion state. The base station list sorting unit 303 of the base station control unit 214 sorts the base stations in the list of handover candidate base stations based on such a standard described above (S624). A handover destination determination unit 304a of the base station control unit 214 determines a base station with a smallest RTT in comparison in the list of handover candidate base stations as the handover destination base station (S625).

The base station 201 informs the terminal 204 of the handover destination base station determined (S626). The base station 201 and the terminal 204 informed of the handover destination base station by the base station 201 execute handover (S613, S627).

Figure 7:
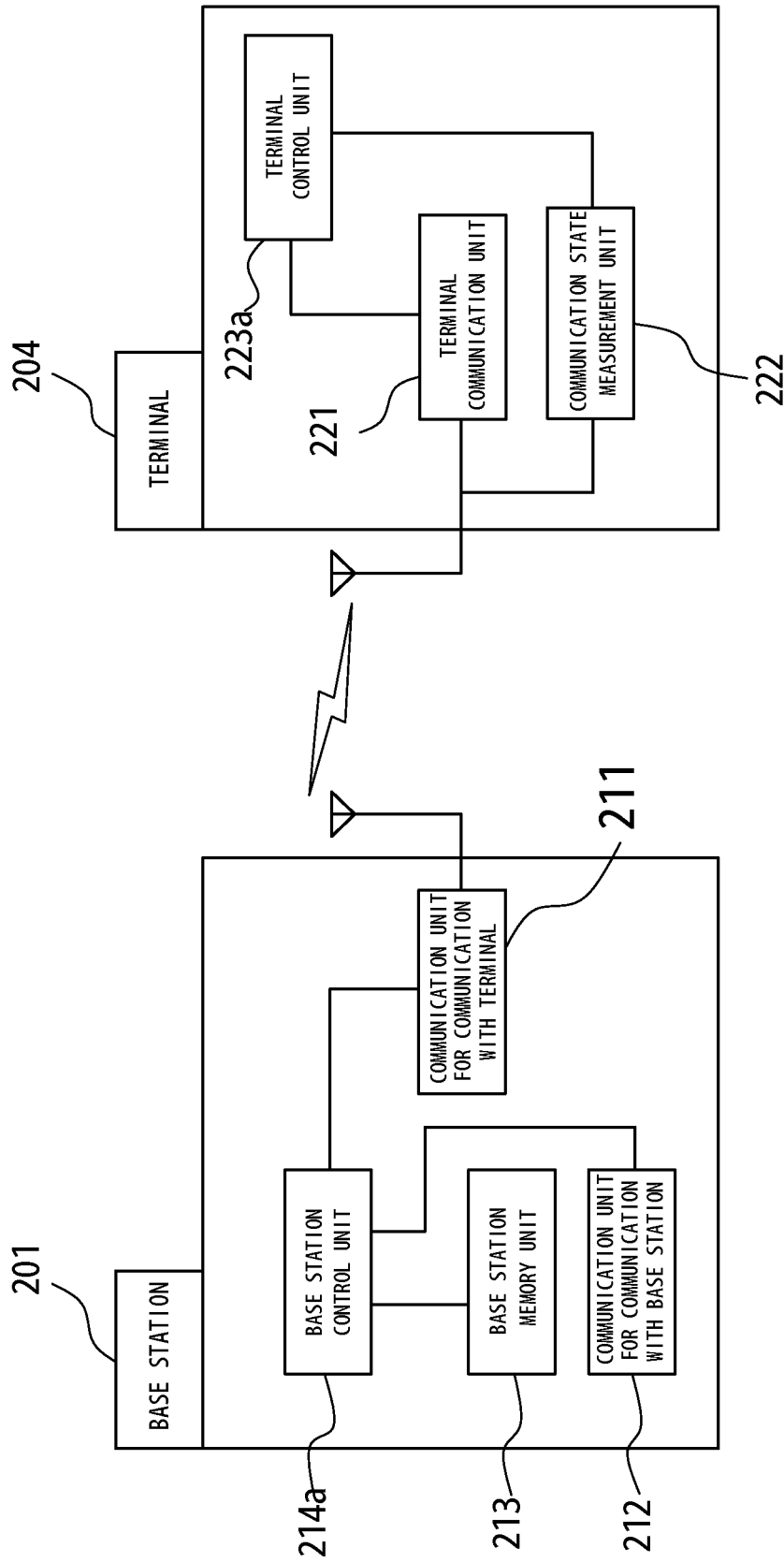
FIG. 7 is a diagram illustrating schematic configurations of a base station and a terminal according to a second embodiment of the present invention.

Next, a base station and a terminal according to a second embodiment of the present invention will be described. FIG. 7 is a diagram illustrating schematic configurations of a base station and a terminal according to the second embodiment of the present invention. The base station 201 shown in FIG. 7 has, at least, a communication unit 211 for communication with a terminal, a communication unit 212 for communication with a base station, a base station memory unit 213 (base station information obtaining unit) and a base station control unit 214a.

The communication unit 211 for communication with a terminal communicates with the terminal 204. The communication unit 212 for communication with a base station communicates with base stations. However, if capable of distinguishing a communication partner between a base station and a terminal, the communication unit 211 for communication with a terminal and the communication unit 212 for communication with a base station can be configured as one communication unit. The base station memory unit 213 stores an available base station list transmitted from the terminal 204. The available base station list is information on a plurality of base stations capable of communicating with the terminal 204, including evaluation values indicative of the communication states of communications with those base stations. The available base station list is used for handover of the terminal 204.

Figure 8:
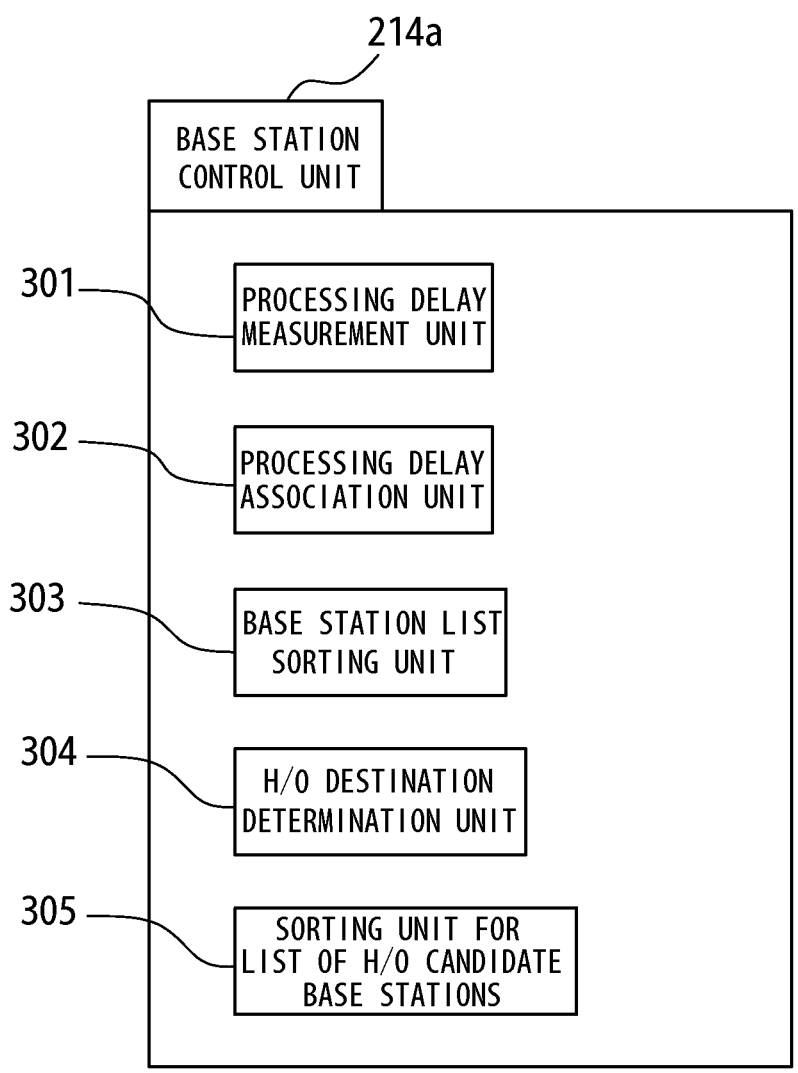
FIG. 8 is a diagram illustrating a schematic configuration of a base station control unit.

As shown in FIG. 8, the base station control unit 214a includes a processing delay measurement unit 301 (communication processing time obtaining unit), a processing delay association unit 302 (determination unit), a base station list sorting unit 303 (determination unit), a handover (H/O) destination determination unit 304 (determination unit) and a sorting unit 305 for the list of handover (H/O) candidate base stations.

The processing delay measurement unit 301 uses the RTT, which is the value indicative of the communication processing time between the base stations, for measurement of processing delay of a target base station in communication between the base stations. The processing delay measurement unit 301 may use the RTT of the protocol such as TCP (Transmission Control Protocol) or SCTP (Stream Control Transmission Protocol).

The processing delay association unit 302 associates each base station in the available base station list sent from the terminal 204 with the RTT of each base station measured by the processing delay measurement unit 301. The base station list sorting unit 303 prioritizes base stations to be a handover destination defined in the available base station list based on the value indicative of the communication processing time between the base stations.

That is, the base station list sorting unit 303 creates an RTT order base station list by sorting the base stations in the list of the base stations associated with the RTTs by the processing delay association unit 302 in ascending order of the RTTs in comparison.

The sorting unit 305 for the list of handover candidate base stations generates the list of handover candidate base stations excluding base stations with the RTTs equal to or over a threshold T from the RTT order base station list and, further, sorts the base stations in the list of handover candidate base stations based on the evaluation values indicative of the communication states of the base stations.

The handover destination determination unit 304 selects a base station with a highest evaluation value, among the base stations in the list of handover candidate base stations, as the handover destination base station.

The terminal 204 shown in FIG. 7 has, at least, a terminal communication unit 221, a communication state measurement unit 222 and a terminal control unit 223a.

The terminal communication unit 221 communicates with the base station 201. The communication state measurement unit 222 monitors the communication states of the base station 201 and other base stations capable of communicating with the terminal 204. The values indicative of the communication state may be the radio intensity, the SNR (Signal to Noise ratio) and the like. The communication state measurement unit 222 measures those values.

Figure 9:
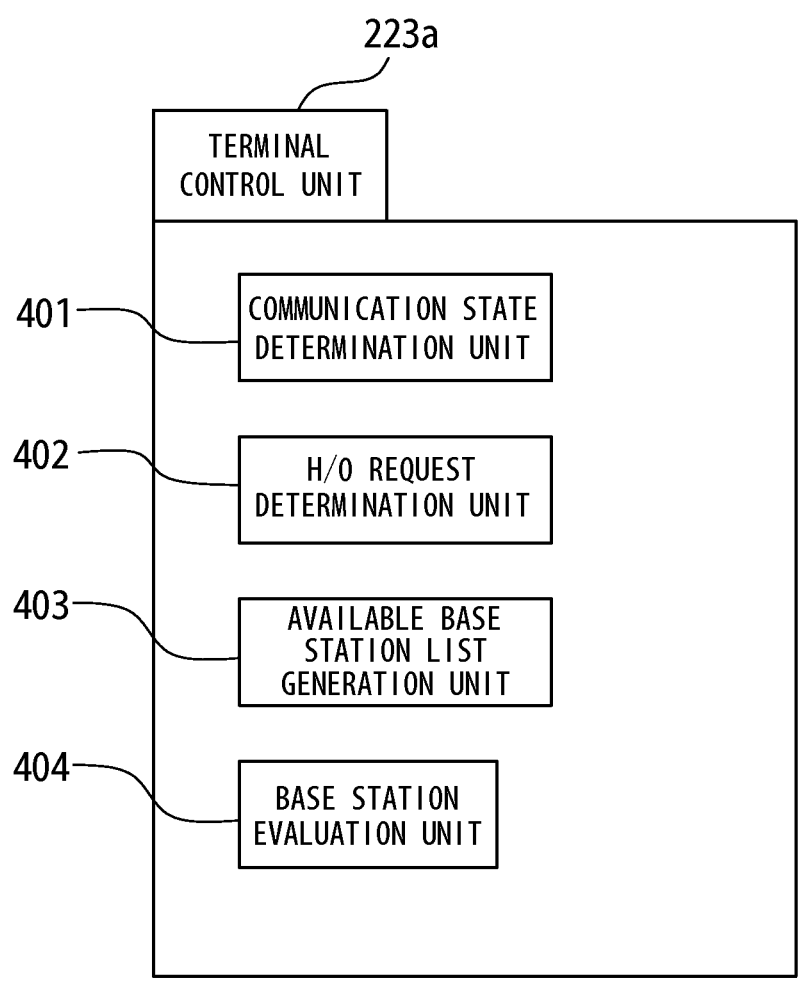
FIG. 9 is a diagram illustrating a schematic configuration of a terminal control unit.

As shown in FIG. 9, the terminal control unit 223a has, at least, a communication state determination unit 401, a handover (H/O) request determination unit 402, an available base station list generation unit 403 and a base station evaluation unit 404.

When the value indicative of the communication state of the base station 201 measured by the communication state measurement unit 222 has reached a certain threshold, the communication state determination unit 401 determines that the communication state is deteriorated. Deterioration of the communication state may be ascribed to, for example, increase in the communication delay between the terminal and the base station 201, reduction in the radio intensity of received signals and increase in noise in the received signals.

When the communication state determination unit 401 determines that the communication state is deteriorated, the handover request determination unit 402 determines whether to request handover. It is considered that, at this time, the handover request determination unit 402 may refrain from handover during an emergency call (call to the police or the fire department) or handover within the same base station.

When the handover request determination unit 402 determines to request handover to the base station 201 to which the terminal 204 is connected, the available base station list generation unit 403 searches nearby base stations capable of communicating with the terminal 204 and executes processing to generate the table of the available base station list.

The base station evaluation unit 404 calculates and sets the evaluation values indicative of the communication states of the communication with a plurality of base stations based on the values indicative of the commutation states between the terminal 204 and the plurality of nearby base stations capable of communicating with the terminal 204, such as the RTT between the terminal and the base station, the radio intensity of the received signal and the SNR (Signal to Noise ratio) of the received signal, and stores the evaluation values of the base stations in the available base station list.

Such evaluation values may be calculated based on any one of, or a combination of some of, the RTT between the terminal and the base station, the radio intensity of the received signal and the SNR (Signal to Noise ratio) of the received signal. The base station evaluation unit 404 sets high evaluation values to a base station with a small RTT between the terminal and the base station, a base station with a high radio intensity of the received signal and a base station with a small noise in the received signal.

Figure 10:
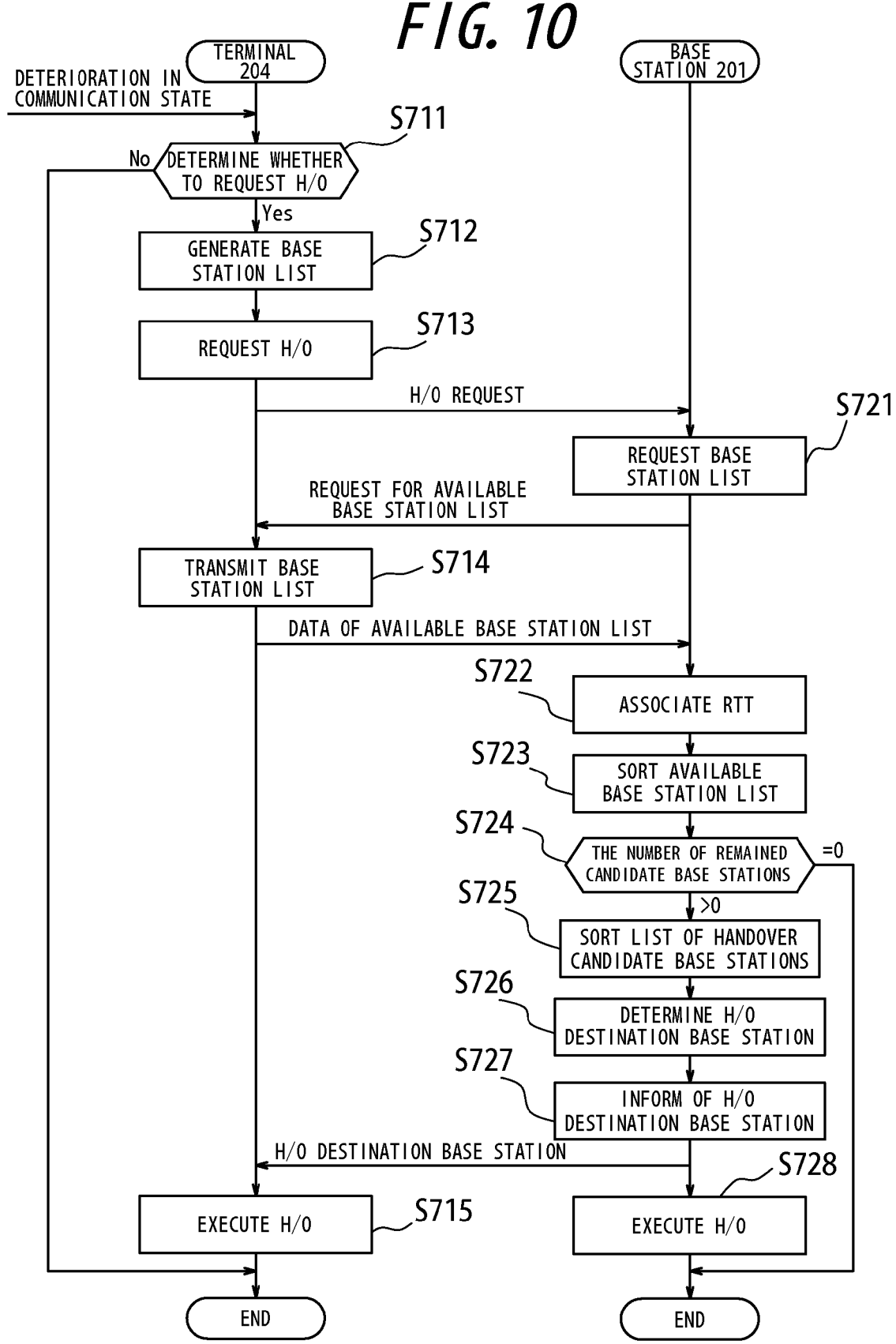
FIG. 10 is a sequence diagram illustrating execution of handover based on the handover request from the terminal.

Next, operations of the base station and the terminal according to the second embodiment of the present invention will be described with reference to a sequence diagram shown in FIG. 10. FIG. 10 is a sequence diagram illustrating execution of handover based on the handover request from the terminal.

If the communication state measurement unit 222 of the terminal 204 detects deterioration in the communication state during communication between the terminal 204 and the base station 201, the handover request determination unit 402 of the terminal control unit 223a shown in FIG. 9 determines whether to request handover (H/O) (S711). If the handover request determination unit 402 determines not to execute the handover request (if No), the terminal control unit 223a ends the processing. If the handover request determination unit 402 determines to execute the handover request (if Yes), the available base station list generation unit 403 searches nearby other base stations capable of communicating with the terminal 204 and generates the available base station list (S712). At this time, in order to search the base stations, the terminal communication unit 221 is configured to receive signals of the broadcast control channels for search for the base stations, broadcasted by the base stations.

The base station evaluation unit 404 calculates the evaluation values indicative of the communication states of communication with the base stations based on the values of the communication states of the nearby base stations capable of communicating with the terminal 204 and stores the evaluation values of the base stations calculated in the available base station list in association with respective base stations in the list. The value indicative of the communication state of the base station is obtained by receiving and measuring radio signals transmitted from the base station by the communication state measurement unit 222.

Next, the terminal 204 sends the handover request to the base station 201 (S713). Upon reception of the handover request, the base station control unit 214a of the base station 201 requests the available base station list to the terminal 204 (S721). In response, the terminal 204 transmits the available base station list including the evaluation values of the base stations to the base station 201 (S714). The available base station list is transmitted from the terminal communication unit 221 to the base station 201 in communication with the terminal 204.

The base station control unit 214a of the base station 201 extracts the base stations which correspond to the base stations in the list of connected base stations stored in the base station 201 from the available base station list transmitted from the terminal 204. The processing delay association unit 302 of the base station control unit 214a estimates the load condition of each of the base stations extracted from the available base station list based on the value indicative of the communication processing time between the base stations, and associates the load conditions of the base stations estimated with the base stations in the available base station list. In practice, the processing delay association unit 302 associates the RTTs in the SCTP information stored in the base station 201 with the base stations in the available base station list (S722).

Such association is processing to associate an identifier of a base station with one RTT of SCTP communication between the base station and the base station 201. The identifier of the base station is a number or a character string unique to the base station and may be, for example, the base station ID, the IP address, the MAC address or the host name.

Next, the base station list sorting unit 303 of the base station control unit 214a sorts the base stations associated with the RTTs in ascending order of the RTTs (S723). The base station list sorted is referred to as the RTT order base station list. Then, the base station control unit 214a excludes base station(s) with the RTT equal to or over the threshold T from the RTT order base station list and determines whether there is a base station with the RTT smaller than the threshold T (S724). The list, from which the base station(s) with the RTT equal to or over the threshold T is removed, is referred to as the list of handover candidate base stations.

If there is no base station having the RTT smaller than the threshold T (if equal to zero), the base station control unit 214a ends processing to determine the handover destination base station and shifts to processing for having no candidate base station. The threshold T is defined at a small value enough not to have a trouble with communication between the base stations. That is, if the RTT exceeds the threshold T, the base station control unit 214a considers that there is a trouble with the communication and does not select the base station as the handover destination base station. If there is a base station with the RTT smaller than the threshold T (if larger than zero), the sorting unit 305 for the list of handover candidate base stations of the base station control unit 214a sorts the base stations in the list of handover candidate base stations based on the evaluation values of the base stations (S725), and the handover destination determination unit 304 of the base station control unit 214a determines a base station with a highest evaluation value in the list of handover candidate base stations as the handover destination base station (S726). The handover destination determination unit 304 may eliminate at least a base station with a lowest evaluation value from the list of handover candidate base stations and determine the handover destination base station from the list of handover candidate base stations, from which the base station with the lowest evaluation value is removed.

The base station 201 informs the terminal 204 of the handover destination base station determined (S727). The base station 201 and the terminal 204 informed of the handover destination base station by the base station 201 execute handover (S715, S728).

Figure 11:
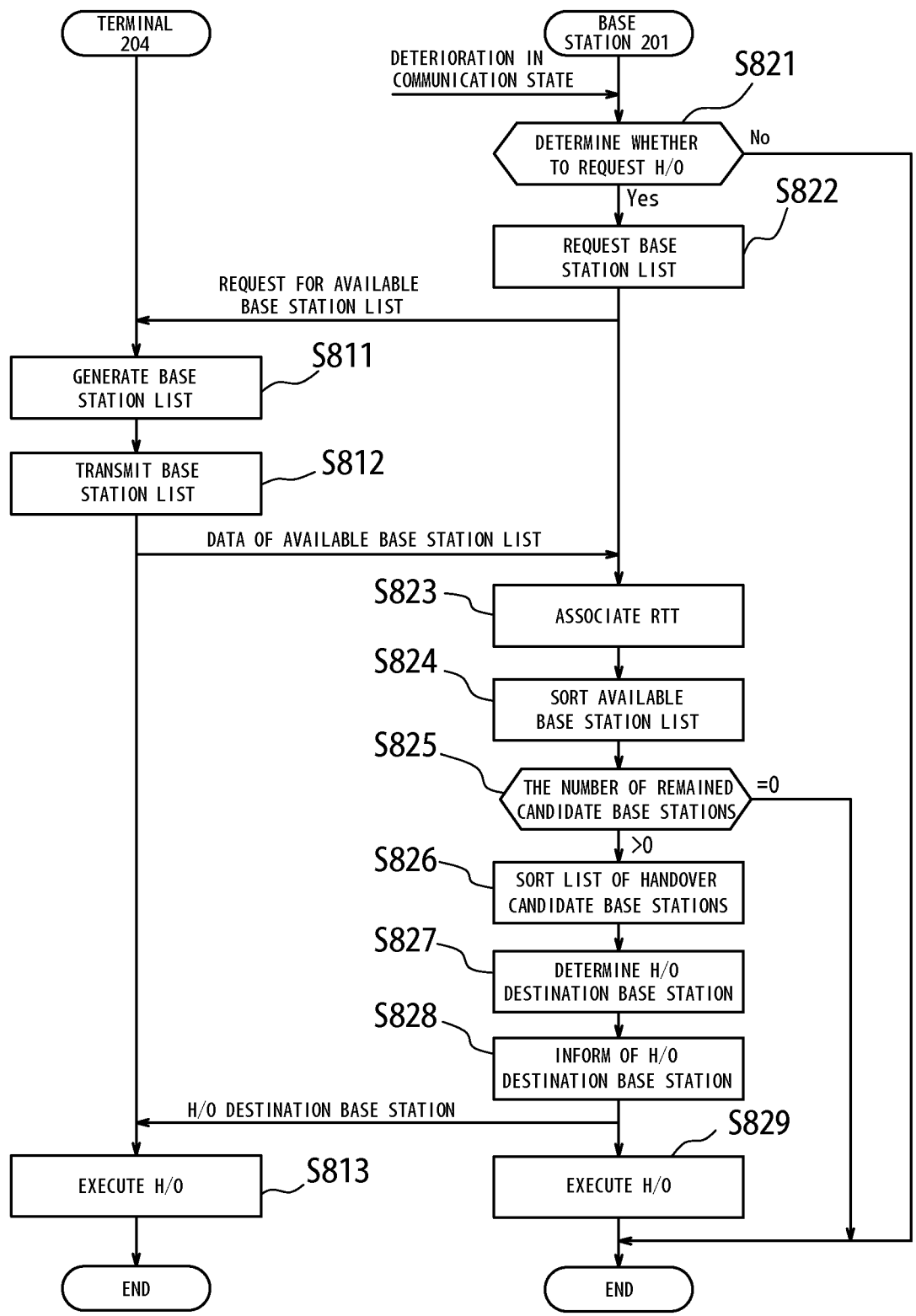
FIG. 11 is a sequence diagram illustrating execution of handover based on determination by the base station.
Figure 12:
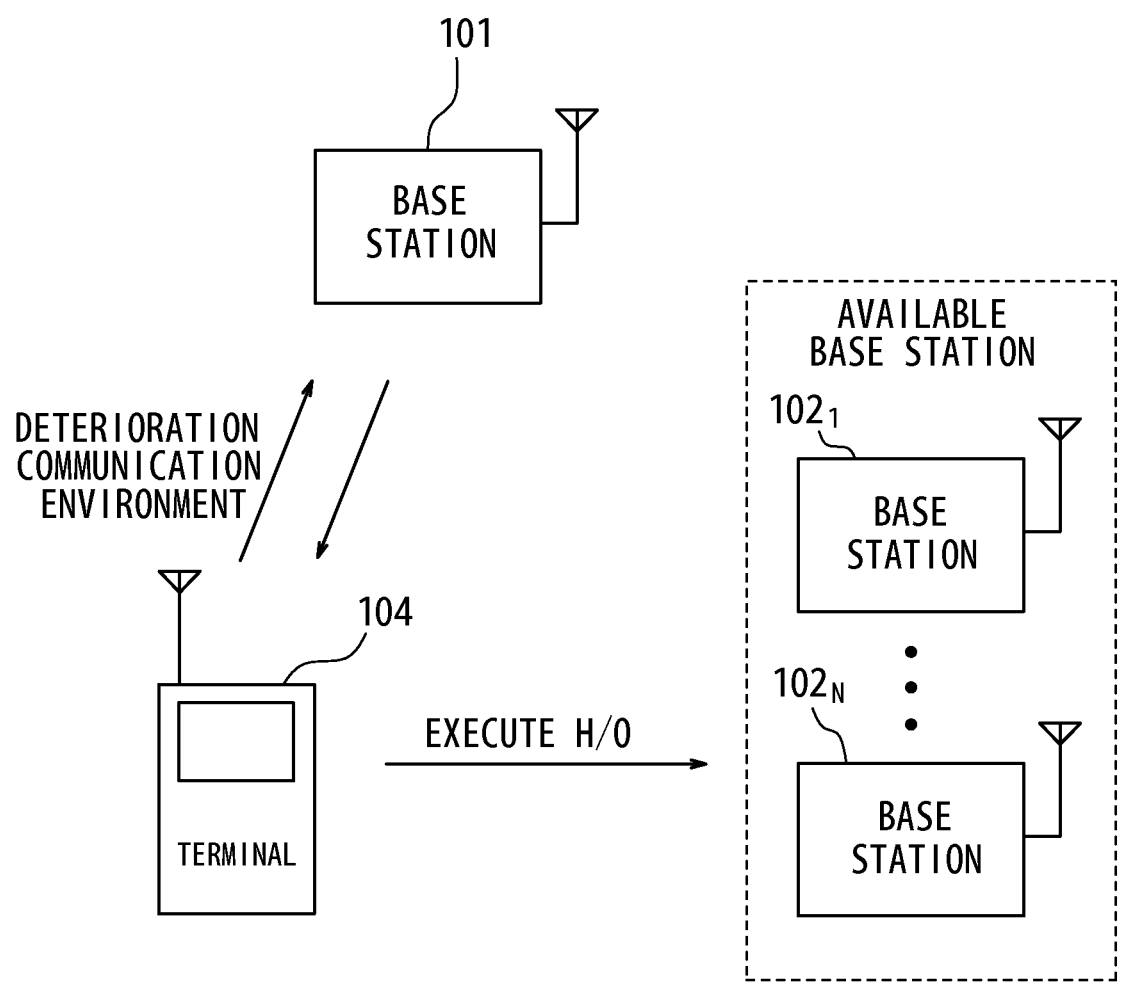
FIG. 12 is a diagram illustrating a relation between a base station and a terminal according to a conventional method.

FIG. 11 is a sequence diagram illustrating operations of the base station and the terminal to execute handover based on determination by the base station.

Upon detection of deterioration in the communication state during communication with the terminal 204, the base station control unit 214a of the base station 201 determines whether to execute handover to change the access point of the terminal 204. In addition, if the base station is put into the congestion state, the base station control unit 214a, in order to reduce the load, determines whether to execute handover to change the access point of the terminal 204 (S821). If determining not to execute handover (if No), the base station control unit 214a ends the processing. If determining to execute handover (if Yes), the base station control unit 214a commands the terminal 204 in communication to execute handover and requests the available base station list (S822).

In response, the available base station list generation unit 403 of the terminal 204 searches nearby other base stations capable of communicating with the terminal 204 and generates the available base station list (S811). At this time, in order to search the base stations, the terminal communication unit 221 is configured to receive signals of the broadcast control channels for search for the base stations, broadcasted by the base stations.

In addition, the base station evaluation unit 404 calculates the evaluation values indicative of the communication states of the base stations based on the values of the communication states of the nearby base stations capable of communicating with the terminal 204 and stores the evaluation values of the base stations calculated in the available base station list in association with respective base stations in the list. The value indicative of the communication state of the base station is obtained by receiving and measuring a radio signal transmitted from the base station by the communication state measurement unit 222.

Next, the terminal 204 transmits the available base station list including the evaluation values of the base stations to the base station 201 (S812). The available base station list is transmitted from the terminal communication unit 221 to the base station 201 in communication.

The base station control unit 214a extracts base stations which correspond to the base stations in the list of connected base stations stored in the base station 201 from the available base station list received from the terminal 204. The processing delay association unit 302 of the base station control unit 214a estimates the load condition of each of the base stations extracted from the available base station list based on the value indicative of the communication processing time between the base stations, and associates the load conditions of the base stations estimated with the base stations extracted. In practice, the processing delay association unit 302 associates the RTTs in the SCTP information stored in the base station 201 with the base stations in the available base station list (S823).

Next, the base station list sorting unit 303 of the base station control unit 214a sorts the base stations associated with the RTTs in ascending order of the RTTs (S824). The base station list sorted is referred to as the RTT order base station list. Next, the base station control unit 214a excludes base station(s) with the RTT equal to or over the threshold T from the RTT order base station list and determines whether there is a base station with the RTT smaller than the threshold T (S825). The list, from which the base station(s) with the RTT equal to or over the threshold T is removed, is referred to as the list of handover candidate base stations.

If there is no base station having the RTT smaller than the threshold T (if equal to zero), the base station control unit 214a ends processing to determine the handover destination base station and shifts to processing for having no candidate base station. The threshold T is defined at a small value enough not to have a trouble with communication between the base stations. That is, if the RTT exceeds the threshold T, the base station control unit 214a considers that there is a trouble with the communication and does not select the base station as the handover destination base station. If there is a base station with the RTT smaller than the threshold T (if larger than zero), the sorting unit 305 for the list of handover candidate base stations of the base station control unit 214a sorts the base stations in the list of handover candidate base stations based on the evaluation values of the base stations (S826), and the handover destination determination unit 304 of the base station control unit 214a determines a base station with a highest evaluation value in the list of handover candidate base stations as the handover destination base station (S827). The handover destination determination unit 304 may eliminate at least a base station with a lowest evaluation value in the list of handover candidate base stations and determine the handover destination base station from the list of handover candidate base stations, from which the base station with the lowest evaluation value is removed.

The base station 201 informs the terminal 204 of the handover destination base station determined (S828). The base station 201 and the terminal 204 informed of the handover destination base station by the base station 201 execute handover (S813, S829).

In order to determine the handover destination base station, although the base station sorts the base stations associated with the RTTs in the order of the RTTs and then sorts the base stations based on the evaluation values thereof in the above second embodiment, it is also possible to sort the base stations based on the evaluation values thereof and then sort the base stations in the order of the RTTs.

Further, although the base station determines the handover destination base station by obtaining the available base station list from the terminal in the above embodiments, it is also possible that the terminal determines the handover destination base station by obtaining the list of the base stations associated with the RTTs from the base station.

REFERENCE SIGNS LIST

101, $102_1$-$102_N$, 201, $202_1$-$202_N$ base station
104, 204 terminal
211 communication unit for communication with terminal
212 communication unit for communication with base station
213 base station memory unit
214, 214a base station control unit
221 terminal communication unit
222 communication state measurement unit
223, 223a terminal control unit
301 processing delay measurement unit
302 processing delay association unit
303 base station list sorting unit
304 handover destination determination unit
305 sorting unit for list of handover candidate base stations
401 communication state determination unit
402 handover request determination unit
403 available base station list generation unit
404 base station evaluation unit

The invention claimed is:

1. A communication method of a radio communication system comprising a radio terminal apparatus and a base station apparatus which performs radio communication with the radio terminal apparatus and allowing for communication between a plurality of base station apparatuses, the communication method comprising the steps of:
obtaining, by the base station apparatus being connected to the radio terminal apparatus, information on a plurality of base station apparatuses capable of communicating with the radio terminal apparatus, from the radio terminal apparatus; and
determining, by the base station apparatus being connected to the radio terminal apparatus, an access point base station apparatus to connect to the radio terminal apparatus for communication based on the information on the plurality of base station apparatuses obtained at the step of obtaining and a value indicative of a communication processing time between the base station apparatuses.

2. The communication method according to claim 1, wherein the step of determining comprises estimating a load condition of each of the base station apparatuses in the information on the plurality of base station apparatuses obtained at the step of obtaining based on the value indicative of the communication processing time between the base station apparatuses, and based on the estimated load condition of each of the base station apparatuses, determining the access point base station apparatus to connect to the radio terminal apparatus for communication, wherein the radio terminal apparatus is within a coverage area of the access point base station apparatus.

3. The communication method according to claim 1, wherein the value indicative of the communication processing time between the base station apparatuses is a round trip time between the base station apparatuses.

4. The communication method according to claim 1, wherein the value indicative of the communication processing time between the base station apparatuses is a value based on Network Time Protocol (NTP) communication of the base station apparatuses.

5. A communication method of a radio communication system comprising a radio terminal apparatus and a base station apparatus which performs radio communication with the radio terminal apparatus and allowing for communication between a plurality of base station apparatuses, the communication method comprising the steps of:
obtaining, by the base station apparatus being connected to the radio terminal apparatus, information on a plurality of base station apparatuses capable of communicating with the radio terminal apparatus including evaluation values indicative of communication states between the radio terminal apparatus and the plurality of base station apparatuses capable of communicating with the radio terminal apparatus, from the radio terminal apparatus; and
determining, by the base station apparatus being connected to the radio terminal apparatus, an access point base station to connect to the radio terminal apparatus for communication based on the information on the plurality of base station apparatuses including the evaluation values obtained at the step of obtaining and a value indicative of a communication processing time between the base station apparatuses.

6. The communication method according to claim 5, wherein at the step of determining, a base station apparatus with a highest evaluation value among base station apparatuses having the values indicative of the communication processing times between the base station apparatuses less than a threshold as the access point base station apparatus to connect to the radio terminal apparatus for communication.

7. The communication method according to claim 5, wherein at the step of determining, at least a base station apparatus with a lowest evaluation value, among base station apparatuses having the values indicative of the communication processing times between the base station apparatuses less than a threshold, is excluded from the access point base station apparatus to connect to the radio terminal apparatus for communication.

8. The communication method according to claim 5, wherein the value indicative of the communication processing time between the base station apparatuses is a round trip time between the base station apparatuses.

9. The communication method according to claim 5, wherein the value indicative of the communication processing time between the base station apparatuses is a value based on Network Time Protocol (NTP) communication of the base station apparatuses.

10. A base station apparatus comprising:
a communication processing time obtaining unit configured to obtain a value indicative of a communication processing time between base station apparatuses;
a base station information obtaining unit configured to obtain, from a radio terminal apparatus being connected, information on a plurality of base station apparatuses capable of communicating with the radio terminal apparatus; and
a determination unit configured to determine an access point base station apparatus to connect to the radio terminal apparatus for communication based on the information on the plurality of base station apparatuses obtained by the base station information obtaining unit and the value indicative of the communication processing time between the base station apparatuses obtained by the communication processing time obtaining unit.

11. A base station apparatus comprising:
a communication processing time obtaining unit configured to obtain a value indicative of a communication processing time between base station apparatuses;
a base station information obtaining unit configured to obtain, from a radio terminal apparatus being connected, information on a plurality of base station apparatuses capable of communicating with the radio terminal apparatus, including evaluation values of communication states between the radio terminal apparatus and the plurality of base station apparatuses capable of communicating with the radio terminal apparatus; and
a determination unit configured to determine an access point base station apparatus to connect to the radio terminal apparatus for communication based on the information on the plurality of base station apparatuses including the evaluation values obtained by the base station information obtaining unit and the value indicative of the communication processing time between the base station apparatuses obtained by the communication processing time obtaining unit.

\* \* \* \* \*